United States Patent [19]

Rosendahl et al.

[11] 4,395,093

[45] Jul. 26, 1983

[54] LENS SYSTEM FOR PANORAMIC IMAGERY

[75] Inventors: Gottfried R. Rosendahl; Wiley V. Dykes, both of Winter Park, Fla.

[73] Assignee: The United States of America as represented by the Secretary of the Navy, Washington, D.C.

[21] Appl. No.: 265,874

[22] Filed: May 21, 1981

[51] Int. Cl.³ .............................................. G02B 13/06
[52] U.S. Cl. .................................................... 350/441
[58] Field of Search ......................................... 350/441

[56] References Cited

U.S. PATENT DOCUMENTS 4,012,126  3/1977  Rosendahl et al. ................. 350/441

*Primary Examiner*—John K. Corbin
*Assistant Examiner*—Paul M. Dzierzynski
*Attorney, Agent, or Firm*—Robert F. Beers; Robert W. Adams; Robert J. Veal

[57] ABSTRACT

An optical system for 360° image transfer in which spaced primary and secondary hyperbolically surfaced mirrors are combined with a refractive lens system and are held in spaced relation by a transparent envelope having inner and outer surfaces generated from the near focal point of the primary mirror to avoid image impairing aberrations, and in which the mirrors are so spaced and concentrically arranged that the entrance pupil of the lens system coincides with the near focal point of the primary mirror, which is centrally apertured to form an aperture diaphragm, and the near focal point of the secondary mirror approximates the apex of the primary mirror, the far focal points of the mirrors coinciding to form a confocal set of mirrors. The refractive lens system, in turn, consists of four lens groups, the first lens group of which bends chief rays of image forming light approximately parallel to an optical axis and corrects for field curvature, the second lens group of which corrects for primary and secondary color, the third lens group of which bends the chief rays towards an image plane and provides additional field curvature and secondary color correction, and the fourth lens group of which provides additional secondary color correction and renders the chief rays incident upon the image plane at an angle of approximately 90°.

7 Claims, 3 Drawing Figures

LENS SYSTEM FOR PANORAMIC IMAGERY

BACKGROUND OF THE INVENTION

1. Field of the Invention

This invention, in general, relates to the field of optical image transfer. In particular, this invention relates to a wide angle image transfer system capable of transforming images up to 360° in conjunction with the taking and projection of pictures.

2. Description of the Prior Art

In many training situations the presentation of an external environment is a necessity in order for the trainee to perceive visual cues, and thereby learn to take actions or manipulate training equipment to maximum advantage for a given training situation. A particularly useful approach to reality in display is to generate a 360° wide-angle presentation to produce the effect of the observer being in the center of scene activity.

One such device of the prior art which may be utilized to generate a 360° wide-angle presentation is the Optical System for 360° Image Transfer, of U.S. Pat. No. 4,012,126 by Gottfried R. Rosendahl and Wiley V. Dykes. Disclosed therein is an optical transfer system for 360° image transfer in which spaced primary and secondary hyperbolically surfaced mirrors are combined with a refractive lens system and are held in spaced relationship by a transparent envelope having inner and outer surfaces generated from the near focal point of the primary mirror. The primary mirror coincides with the entrance pupil of the system in order to avoid aberrations by the envelope within a pencil of rays originating from an object or image point and particularly between pencils originating at different object or image points. The aforementioned primary and secondary mirrors are, in turn, spaced and confocally arranged. The near focal point of the secondary mirror approximates the apex of the primary mirror, and the far focal points of the primary and secondary mirrors coincide to form a confocal set of mirrors.

With regard to the aforementioned Optical System for 360° Image Transfer disclosed in U.S. Pat. No. 4,012,126, the lens system included therein is susceptible to damage because of thermal shock, particularly the lens elements of the system fabricated from calcium fluoride. In addition, the lens system does not adequately correct for primary and secondary color which, in turn, will result in a lack of sharpness in a produced image because of chromatic aberrations. Further, the lens system of the above mentioned Optical System for 360° Image Transfer does not operate in exactly the same manner as the subject invention and contains a combination of elements that is somewhat different from that of the present invention.

SUMMARY OF THE INVENTION

The subject invention overcomes some of the disadvantages of the prior art, including those mentioned above, in that it comprises a lens system for panoramic imagery which is capable of transforming visual images up to 360° in conjunction with the taking and the projection of pictures of the aforementioned visual images.

The subject invention is a modification of the optical lens system disclosed in U.S. Pat. No. 4,012,126 to Gottfried R. Rosendahl and Wiley V. Dykes, which corrects for primary and secondary color so that the optical lens system disclosed in the aforementioned U.S. Pat. No. 4,012,126 will transfer an image sufficiently corrected for aberrations to render that image crisp and clear. In addition, the optical lens system disclosed herein is not subject to thermal shock which will cause damage to the optical lens system disclosed in the above mentioned U.S. Pat. No. 4,012,126.

Included in the subject invention are primary and secondary hyperbolic surfaced mirrors held in confocal spaced relationship by a rigid transparent envelope having inner and outer surfaces developed in symmetry from the near focal point of the primary mirror. The entrance pupil of the lens system coincides with the near focal point of the primary mirror; the near focal point of the secondary mirror approximates the apex of the primary mirror and coincides with a central aperture in the primary mirror, which then constitutes the diaphragm for pencils of light rays which form a final image after passing through a refractory lens system. The refractory lens system has therein four lens groups, with the function of the first lens group being to bend marginal rays toward and approximately parallel to the optical axis of the system, and to correct for negative field curvature introduced by the aforementioned primary and secondary hyperbolic mirrors. The second lens group provides primary and secondary color correction, the third lens group bends marginal rays toward a predetermined image plane, and the fourth lens group functions to bring the pencils of light rays through the aperture diaphragm incident upon the aforementioned image plane in sharp focus and in such a way that chief rays are approximately normal to the image plane, such that an image is formed thereon. In addition, the fourth lens group provides for additional field curvature and color correction.

DESCRIPTION OF THE PREFERRED EMBODIMENT

Figure 1:
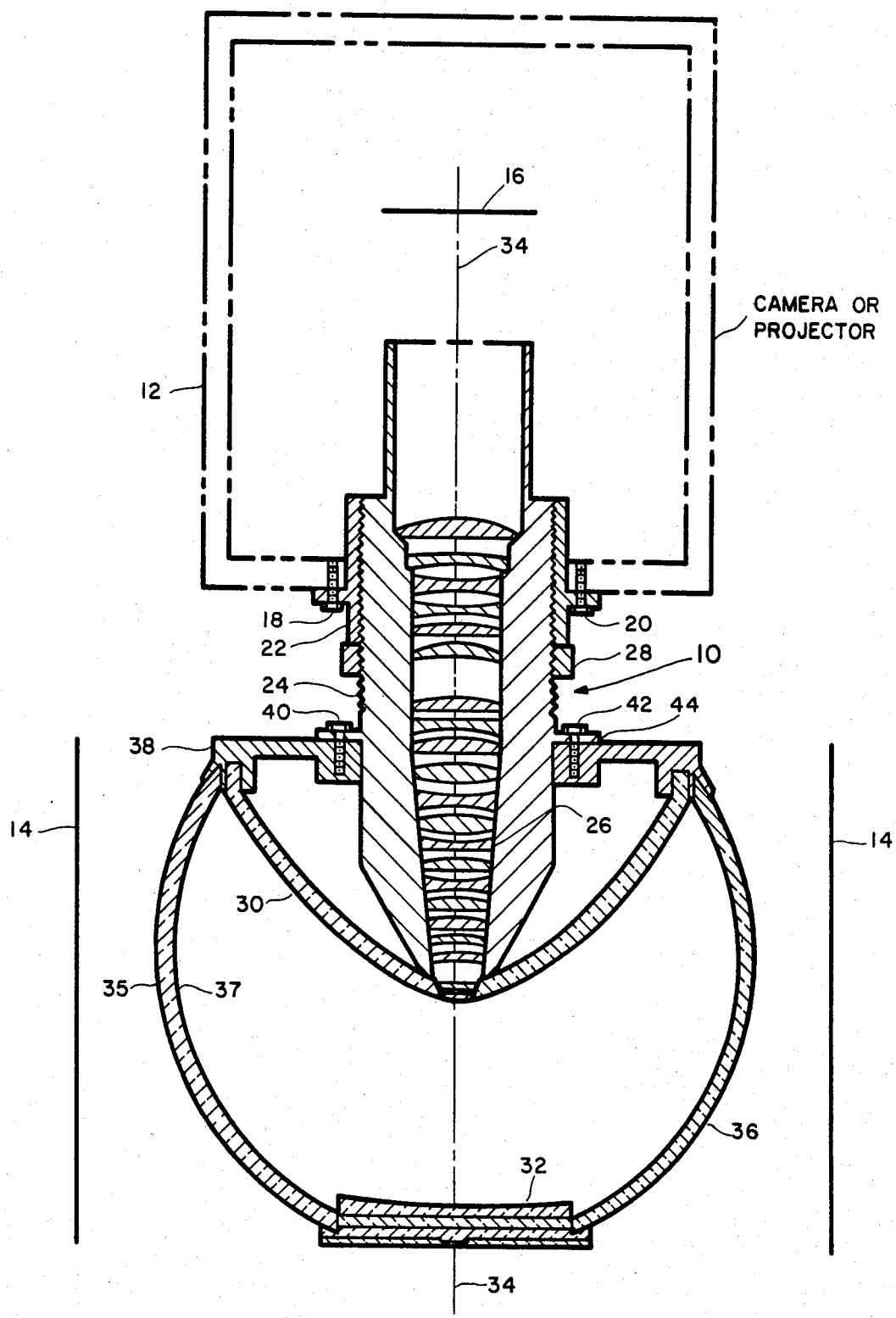
FIG. 1 is a cross-sectional view of an image transfer apparatus incorporating the subject invention therein, and shown in relation to a projector or camera equipment with which it is to be used.

The preferred embodiment of the subject invention will now be discussed in some detail in conjunction with all of the figures of the drawing, wherein like parts are designated by like reference numerals, insofar as it is possible and practical to do so.

Referring now to FIG. 1, there is shown an apparatus 10 for 360° annular image transfer having attached thereto an imaging element 12 which may be, for example, a camera or projector. Positioned adjacent thereto is a 360° scene or reflective display screen, generally indicated as 14. In taking pictures of a scene, apparatus 10 is attached to camera 12 to bring in a 360° image for application to a roll of film 16 utilized within camera 12. In projecting a picture, apparatus 10 is connected to projector 12 for displaying the image of film 16 on reflective display screen 14. To avoid unnecessary duplication of drawing figures, dotted line 12 depicting the aforementioned camera or projector, and lines 14 depicting the above mentioned 360° scene or reflective display screen are utilized since apparatus 10 is employed in both the taking and projecting of an image. Further, it should be understood that while the capability of image transfer apparatus 10 is 360° of view, it may be used for any width of picture up to and including 360°.

As depicted in FIG. 1, apparatus 10 is attached to imaging element 12 by suitable means such as bolts 18 and 20, which hold onto the aforementioned imaging element 12 an internally threaded connector means 22 into which is threaded an externally threaded lens housing 24. Lens housing 24, in turn, accommodates four groups of lenses constituting a refractory lens system 26. In addition, lens housing 24 is adjustably threaded into connector 22 to adjust the focus of apparatus 10 and is locked in adjusted position by a lock nut 28.

Primary and secondary hyperbolically surfaced mirrors, 30 and 32 respectively, are held in aligned spaced symmetrical position about optical axis 34 of apparatus 10 by a transparent envelope 36 which has surfaces 35 and 37. Envelope 36 and mirrors 30 and 32 are attached to lens housing 24 by suitable means, which in the preferred embodiment is shown as an annulus 38, and attaching bolts 40 and 42 passing through a flange 44 of lens housing 24.

In this arrangement, an image taken from scene 14 is passed through transparent envelope 36 to primary mirror 30, which redirects the above-mentioned image to secondary mirror 32. Secondary mirror 32, in turn, redirects the image taken from scene 14 through refractory lens system 26 to film 16. In projection, the image from film 16 is projected through refractory lens system 26 to secondary mirror 32 which redirects the image from film 16 to primary mirror 30. Primary mirror 30 will then redirect the image from film 16 through transparent envelope 36 to reflective display screen 14.

At this time it may be noteworthy to mention that the details for a suitable projector which may be utilized with the subject invention are disclosed in U.S. Pat. No. 3,998,532 to Wiley V. Dykes.

Figure 2:
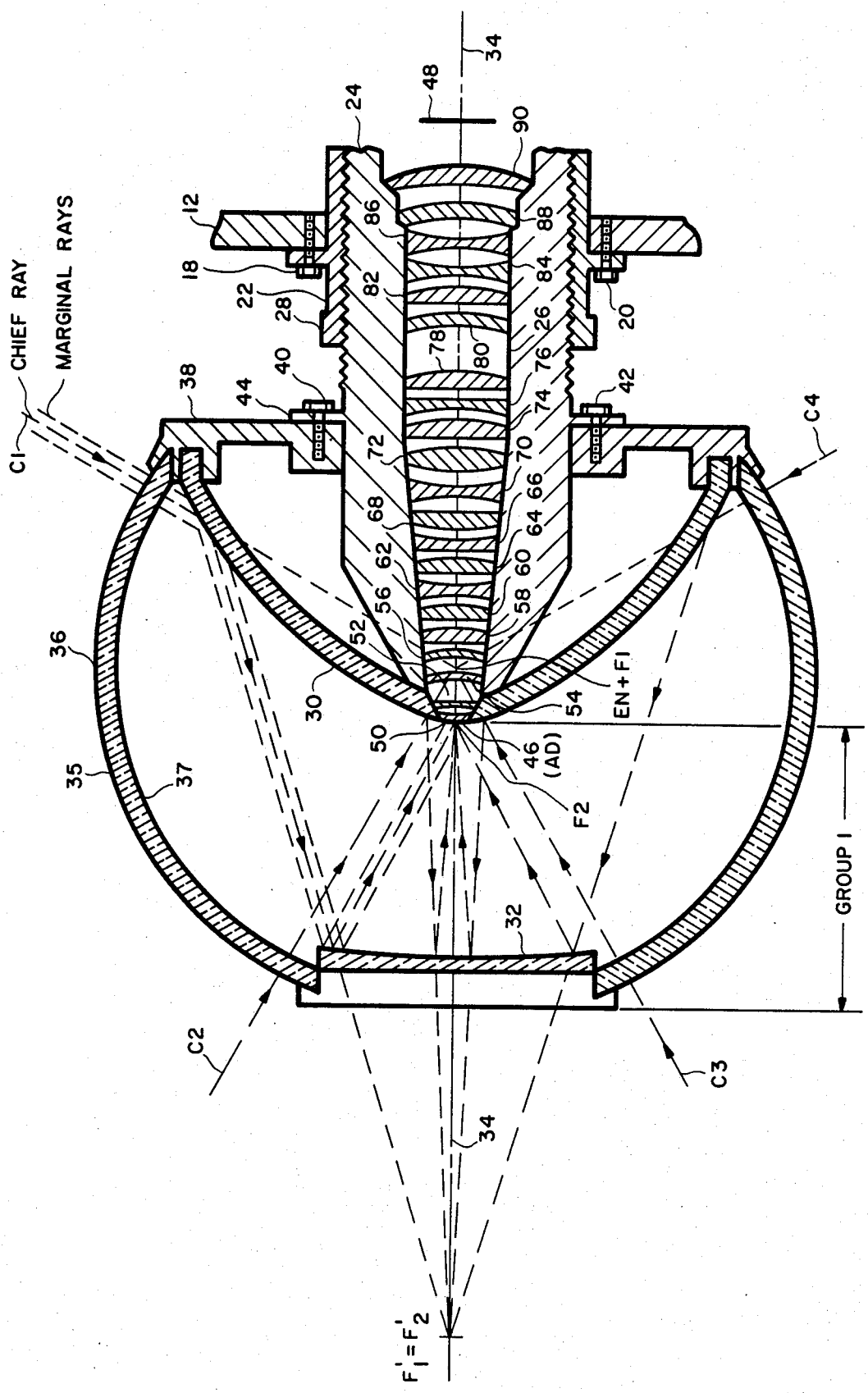
FIG. 2 is a diagrammatical illustration of the arrangement and association of elements of the image transfer apparatus of FIG. 1 in relation to the optical functions thereof.
Figure 3:
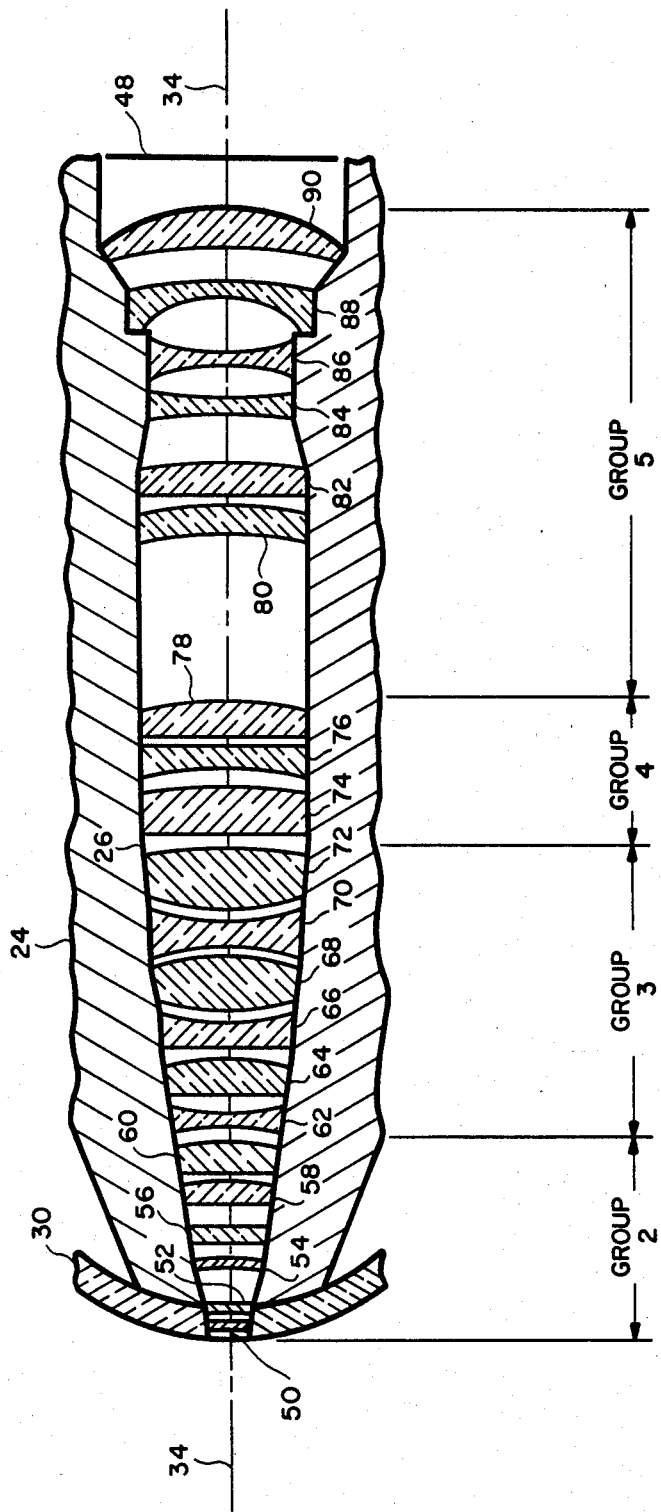
FIG. 3 is an enlarged diagrammatical illustration of the lens system of FIGS. 1 and 2.

For an understanding of the various parameters, spatial arrangements of elements, and contour generation which incorporate the subject invention, attention is now directed to FIGS. 2 and 3. The several elements, primary mirror 30, secondary mirror 32, envelope 36, and refractory lens system 26, which is set forth in four groups, are shown in FIGS. 2 and 3 arranged in a rotationally symmetric position about optical axis 34. A portion of the annulus 38 holding transparent envelope 36 and mirrors 30 and 32, and portions of threaded connector 22 and lens housing 24 are also known for orientation.

With reference again to FIGS. 2 and 3, refractory lens system 26 is positioned between an aperture 46, located at the center of primary mirror 30, and an image plane 48 located along optical axis 34. Elements of refractory lens system 26 as viewed from left to right along optical axis 34 include lenses 50, 52, 54, 56, 58, 60, 62, 64, 66, 68, 70, 72, 74, 76, 78, 80, 82, 84, 86, 88, and 90.

In the preferred embodiment of the subject invention the design criteria, shown in the following example (with all dimensions in millimeters) was utilized to fabricate lenses 50 through 90 of refractory lens system 26, and to space the aforementioned lenses 50 through 90 along optical axis 34 within lens housing 24.

| Element No. | Element Type | Element Material | Element Thickness | Distance between Adjacent Elements | Element Radius Left Surface | Element Radius Right Surface |
|---|---|---|---|---|---|---|
| 36 | Envel | Silica | 4.5 |  | 123.5 | 119.0 |
|  |  |  |  | 89.98 |  |  |
| 30 | Refl | AL | — |  | 63.5 |  |
|  |  |  |  | −127.0 Conic Constant | −1.416071 |  |
| 32 | Refl | AL | — |  | 130.166 |  |
|  |  |  |  | 129.16 Conic Constant | −17.5 |  |
| 50 | Neg | Silica | 2.0 |  | −28.52 | 79.584 |
|  |  |  |  | 3.0 |  |  |
| 52 | Neg | Silica | 2.5 |  | −28.47 | 1729.123 |
|  |  |  |  | 12.0 |  |  |
| 54 | Pos | Schott SK5 | 4.0 |  | −61.485 | −40.832 |
|  |  |  |  | 5.0 |  |  |
| 56 | Pos | Schott SK16 | 5.0 |  | −111.852 | −72.775 |
|  |  |  |  | 7.0 |  |  |
| 58 | Pos | Schott LAK8 | 7.5 |  | −98786.1 | −103.046 |
|  |  |  |  | 2.0 |  |  |
| 60 | Pos | Schott FK51 | 10.0 |  | −9692.1 | −87.089 |
|  |  |  |  | 4.0 |  |  |
| 62 | Neg | Schott F7 | 6.0 |  | −131.752 | 178.586 |
|  |  |  |  | 4.0 |  |  |
| 64 | Pos | Schott LAK21 | 12.5 |  | 429.372 | −100.897 |
|  |  |  |  | 4.0 |  |  |
| 66 | Neg | Schott KZF2 | 8.0 |  | 570.148 | 92.546 |
|  |  |  |  | 5.0 |  |  |
| 68 | Pos | Schott FK51 | 16.0 |  | 124.832 | −125.915 |
|  |  |  |  | 3.0 |  |  |
| 70 | Neg | Schott KZF2 | 10.0 |  | −141.461 | 108.744 |
|  |  |  |  | 4.0 |  |  |
| 72 | Pos | Schott FK51 | 20.0 |  | 115.7 | −148.946 |
|  |  |  |  | 4.0 |  |  |
| 74 | Pos | Schott LAK8 | 15.0 |  | −2171.51 | −267.221 |
|  |  |  |  | 6.0 |  |  |
| 76 | Neg | Schott KZF2 | 8.0 |  | −116.174 | −528.769 |
|  |  |  |  | 3.0 |  |  |
| 78 | Pos | Schott FK51 | 12.0 |  | −3460.83 | −120.327 |

-continued

| Element No. | Element Type | Element Material | Element Thickness | Distance between Adjacent Elements | Element Radius Left Surface | Element Radius Right Surface |
|---|---|---|---|---|---|---|
| | | | | 53.272 | | |
| 80 | Pos | Schott LAKN16 | 10.0 | | −133.636 | −107.647 |
| | | | | 3.0 | | |
| 82 | Pos | Schott FK51 | 10.0 | | −1614.766 | −168.867 |
| | | | | 16.8 | | |
| 84 | Neg | Schott LLF1 | 6.0 | | −151.05 | 220.92 |
| | | | | 10.0 | | |
| 86 | Neg | Silica | 6.0 | | −71.475 | 69.6 |
| | | | | 15.5 | | |
| 88 | Neg | Silica | 5.5 | | −40.0 | −152.094 |
| | | | | 10.544 | | |
| 90 | Pos | Schott SK5 | 10.0 | | −190.073 | −73.216 |

To supplement the above exemplary information, it should be noted that the materials utilized to fabricate lenses 54 through 84 and 90 are commercially available from the Schott Optical Glass Corporation of Duryee, Pa.

In addition, it should be understood that a negative number in the element radius columns of the above example indicates that the radius of the element's surface is centered to the left of the element along optical axis 34, while a positive number indicates that the radius of the element's surface is centered to the right of the element along optical axis 34.

Further, it should be understood that the above-mentioned parameters are representative only; therefore, the artisan may select different ones, if he so desires, and if so doing suits his intended operational purpose for the invention. Hence, whether or not the aforesaid parameters are used with respect to the optical elements involved, all of the lenses discussed above may be designed by the artisan by using any one or all of the following.

(1) ACCOS-V Lens Analysis and Design Program by Scientific Calculations, Inc., of Rochester, N.Y., advantageously, but not necessarily, in conjunction with Supplementary Routines for Lens Design by Computer, by Gottfried R. Rosendahl. The latter mentioned publication is available from the National Technical Information Service, Springfield, Va., Order No. AD-A026 281/6G1.

(2) Any similar textbook teaching the fundamental laws and methods of lens design.

The various elements of the optics system as shown in FIGS. 2 and 3 have been divided into Groups 1, 2, 3, 4, and 5 for a detailed description of function, arrangement, and specifics of generated surfaces. The near and far focal points of primary mirror 30 are indicated at $F_1$ and $F_1'$ on optical axis 34, while the near and far focal points of secondary mirror 32 are indicated at points $F_2$ and $F_2'$ on optical axis 34. Since, according to the invention, mirrors 30 and 32 have been generated as confocal hyperbolic mirrors, the confocal points $F_1'$ and $F_2'$ coincide as indicated in FIG. 2. The entrance pupil (EN) of the lens system, which includes refractory lens system 26, and mirrors 30 and 32, coincides with focal point $F_1$ on optical axis 34. Aperture 46, which hereafter will be referred to as the aperture diaphragm (AD) of the overall lens system, coincides with focal point $F_2$.

Referring now to the five groups of elements as set forth in FIGS. 2 and 3, Group 2 includes transparent envelope 36 having surfaces 35 and 37 generated from $F_1$ as a center of radius, the entrance pupil (EN) located at $F_1$, and mirrors 30 and 32. Group 1 may be considered to be an inverse telescope. The purpose of Group 1 is to reduce the large vertical field angles to amenable magnitudes for a refractive lens system, without introducing large amounts of spherical aberrations, coma, and astigmatism.

Since the surfaces of mirrors 30 and 32 are confocal, and focal point $F_1$ is the center of entrance pupil (EN) of the system, all incident chief rays of image forming light, such as, for example, C1, C2, C3, and C4, are pointing at $F_1$ and reflected toward $F_2$ as indicated in FIG. 2. Since $F_1'$ coincides with $F_2'$, $F_2$ is an image of $F_1$ and thus of EN which is the entrance pupil of the system. In accordance with the subject invention, it was found practical to make $F_2$ and AD coincide with the apex of hyperboloidal mirror 30 such that the aperture to be cut through the aforementioned mirror 30 is minimal.

Since one focal point of a conic surface is imaged anastigmatically into the other focal point, $F_1$ is imaged anastigmatically into $F_2$. Astigmatism on mirrors is determined only by the meridional and sagittal curvatures at the point of incidence. These curvatures must be thus so that no astigmatic error occurs for any ray of image forming light between $F_1$ and $F_2$, independent of the object position along those rays. The foregoing follows from the fact that the relationship between meridional and sagittal curvatures for anastigmatic imagery does not contain the object or image distance. Thus, according to the arrangement of elements in Group 1, it can be concluded that all marginal rays of image forming light, which are rays infinitesimally close to a chief ray of image forming light, accompanying a chief ray of image forming light through aperture 46 provide anastigmatic imagery.

Considering further the elements of Group 1, in the optimum combination of hyperbolic mirrors 30 and 32 with respect to optical performance, primary mirror 30 is formed with a relatively small radius and small eccentricity in relation to secondary mirror 32. Secondary mirror 32, in turn, is formed with a relatively large radius and large eccentricity, such that the angle difference between marginal rays of image forming light accompanying and parallel to the chief ray of image forming light in object space and in the meridional plane becomes negligibly small. This results in coma becoming negligibly small for all practical purposes. At the same time, the difference between image distances for the maximum and minimum ray, 120° and 30° toward optical axis 34, becomes reasonably small which, in turn, facilitates field curvature correction with refractive lens system 26, which follows mirrors 30 and 32, even though the field curvature produced by mirrors 30 and 32 is negative.

The selection, arrangement, and association of elements as described above for Group 1 not only provides a vertical angle of 90° without vignetting, but also permits the use of transparent envelope 36 to enclose and support mirrors 30 and 32. Since according to the subject invention, envelope 36 is centered at $F_1$, all chief rays of image forming light will pass normal to surfaces 35 and 37 of envelope 36 and thereby introduce neither coma nor astigmatism.

Group 2 corrects for the negative field curvature introduced by Group 1, as discussed above, and bends marginal rays of image forming light toward optical axis 34 and into an approximately parallel position thereto. To reduce the negative field curvature caused by Group 1, Group 2 includes two strong negative lenses 50 and 52 placed close to aperture diaphragm 46 followed by four strong positive lenses 54, 56, 58, and 60. The overall effect of the aforementioned lenses 50 through 60 is to provide a positive power such that the negative field curvature introduced by Group 1 will be significantly reduced. In addition, reduction of negative field curvature by Group 2 requires that negative lenses 50 and 52 be fabricated from a material having a low refractive index, while positive lenses 54, 56, and 58 be fabricated from materials having high refractive indexes. Accordingly, lenses 50 and 52 were fabricated from silica and lenses 54, 56, and 58 were respectively fabricated from Schott SK5, Schott SK16, and Schott LAK8. In addition, positive lens 60, which has a high refractive index of 1.471, is fabricated from Schott FK51.

Since lenses 50 and 52 are subjected to a large heat load when apparatus 10, FIG. 1, projects an image upon screen 14, FIG. 1, utilization of silica to fabricate lenses 50 and 52 allows the aforementioned image to be projected through lenses 50 and 52 without damage to lenses 50 and 52. Positive lens 60 of Group 2 functions to reduce undesirable secondary color and was fabricated from Schott FK51 to prevent thermal shock. In addition, the six lens elements of Group 2 are spaced for air cooling because of the proximity of Group 2 to aperture diaphragm 46 and the heat developed when an arc image is formed at aperture diaphragm 46 during projection.

The design of Group 2 does not allow for sufficient color correction within refractory lens system 26. Group 3 of the aforementioned refractory lens system provides the necessary color correction without introducing undesirable Petzval curvature. Group 3 utilizes three pairs of negative, positive lenses to provide for color correction, with the first pair consisting of lenses 62 and 64, the second pair consisting of lenses 66 and 68, and the third pair consisting of lenses 70 and 72. Lens pair 62,64 corrects for primary color, lens pair 66,68 and lens pair 70,72 correct for primary and secondary color.

At this time it should be mentioned that the overall power of Group 3 is zero, since the magnitudes of the power of each positive and of each negative lens of the three above-mentioned lens pairs of Group 3 are equivalent. Further, it should be noted that the refractive index of each positive and negative lens of the aforementioned three lens pairs of Group 3 are approximately equal, but differ with respect to dispersion or Abbe-number.

Group 4 bends the marginal rays of image forming light from a direction which is approximately parallel to optical axis 34 toward image plane 48. To bend the marginal rays of image forming light toward image plane 48, Group 4 includes positive lenses 74 and 78 and negative lens 76. Further, Group 4 provides for additional field curvature correction while the combination of lenses 76 and 78 contributes to secondary color correction.

Group 5 functions to flatten the field by adding a positive Petzval curvature such that an image may be formed at image plane 48, and provides for additional color correction. Group 5 includes three positive lenses 80, 82, and 90, and three negative lenses, 84, 86, and 88. The combination of lenses 86 and 88 provides strong field curvature correction while lenses 80, 82, and 84 provide additional field curvature correction. In addition, the combination of lenses 82 and 84 corrects for secondary color. Lens 90 functions to bring chief rays of image forming light C1, C2, C3, and C4 incident upon image plane 48, with the angle of incidence being approximately 90°; the latter angle of which is desirable in order to make uniform the illumination along the radius of the image plane.

It should be noted at this time that lenses 50 through 90 of refractory lens system 26 are fabricated from glasses which are highly resistant to thermal shock so as to prevent the damage of any of the aforementioned lenses 50 through 90 due to excessive heat.

From the foregoing description, it may readily be seen that the subject invention comprises a new, unique and exceedingly useful lens system for panoramic imagery which constitutes a considerable improvement over the known prior art. Obviously, many modifications and variations of the present invention are possible in light of the above teachings. It is, therefore, to be understood that within the scope of the appended claims the invention may be practiced otherwise than as specifically described.

What is claimed is:

1. An optical system for 360° annular image transfer having mirror means positioned upon a predetermined optical axis so as to form an entrance pupil for said optical system adapted for passing therethrough chief rays and marginal rays of image forming light, and thereby reduce the vertical field angles of said chief rays and marginal rays of image forming light to a predetermined magnitude wherein the improvement comprises, in combination:

first lens means spatially disposed downstream from said mirror means on said optical axis for providing a positive power to correct for negative field curvature caused by said mirror means, and for bending the marginal rays of image forming light toward said optical axis and into a position approximately parallel to said optical axis, said first lens means having first and second negative lenses spatially disposed downstream from said mirror means on said optical axis, each negative lens of which has a low refractive index, and each negative lens of which is spaced for air cooling so as to prevent heat damage, and first, second, third and fourth positive lenses spatially disposed downstream from said second negative lens on said optical axis, each positive lens of which has a high refractive index, and each positive lens of which is spaced for air cooling so as to prevent heat damage;

second lens means spatially disposed downstream from said first lens means on said optical axis and having an overall power of zero for providing primary and secondary color correction;

third lens means spatially disposed downstream from said second lens means on said optical axis for bending the marginal rays of image forming light from the aforesaid position approximately parallel to said optical axis toward a predetermined image plane, and for providing additional field curvature correction and secondary color correction; and fourth lens means spatially disposed downstream from said third lens means on said optical axis for adding a positive Petzval curvature such that an image may be formed at said image plane, for bringing the chief rays of image forming light incident upon said image plane at a predetermined angle, and for providing additional field curvature correction and secondary color correction.

2. The optical system of claim 1, wherein said first and second negative lenses are fabricated from silica, and said first, second, third, and fourth positive lenses are fabricated respectively from Schott SK5, Schott SK16, Schott LAK8, and Schott SK51.

3. The optical system of claim 1, wherein said second lens means comprises:

a first lens pair spatially disposed downstream from said first lens means on said optical path providing primary color correction;

a second and a third lens pair spatially disposed downstream from said first lens pair on said optical path providing primary and secondary color correction;

the first lens and the second lens of said first lens pair respectively being a negative lens and a positive lens of approximately equivalent refractive index;

the first lens and the second lens of said second lens pair respectively being a negative lens and a positive lens of approximately equivalent refractive index; and the first lens and the second lens of said third lens pair respectively being a negative lens and a positive lens of approximately equivalent refractive index.

4. An optical system for 360° annular image transfer having mirror means positioned upon a predetermined optical axis so as to form an entrance pupil for said optical system adapted for passing therethrough chief rays and marginal rays of image forming light, and thereby reduce the vertical field angles of said chief rays and marginal rays of image forming light to a predetermined magnitude, wherein the improvement comprises in combination:

first lens means spatially disposed downstream from said mirror means on said optical axis for providing a positive power to correct for negative field curvature caused by said mirror means, and for bending the marginal rays of image forming light toward said optical axis and into a position approximately parallel to said optical axis;

second lens means spatially disposed downstream from said optical axis and having an overall power of zero for providing primary and secondary color correction;

third lens means spatially disposed downstream from said second lens on said optical axis for bending the marginal rays of said image forming light from the aforesaid position to approximately parallel to said optical axis toward a predetermined image plane, and for providing additional field curvature correction and secondary color correction, said third lens means having first and second positive lenses spatially disposed downstream from said second lens means on said optical axis, and a negative lens positioned between said first and second positive lenses on said optical path; and fourth lens means spatially disposed downstream from said third lens means on said optical axis for adding a positive Petzval curvature such that an image may be formed at said image plane for bringing the chief rays of image forming light incident upon said image plane at a predetermined angle, and for providing additional field curvature correction and secondary color correction.

5. The optical system of claim 4, wherein each positive and negative lens of said third lens means is fabricated from a glass which is highly resistant to thermal shock.

6. The optical system of claim 1, wherein said fourth lens means comprises:

first and second positive lenses spatially disposed downstream from said third lens means on said optical axis;

a first negative lens spatially disposed downstream from said second positive lens on said optical axis;

second and third negative lenses spatially disposed downstream from said first negative lens adapted for providing strong field curvature correction, and secondary color correction;

a third positive lens spatially disposed downstream from said third negative lens on said optical axis adapted for bringing the chief rays of image forming light incident upon said image plane at said predetermined angle; and said first and second positive lenses and said first negative lens adapted for providing additional field curvature correction.

7. The optical system of claim 6, wherein each positive and negative lens of said fourth lens means is fabricated from a glass which is highly resistant to thermal shock.

* * * * *